United States Patent [19]

Ecker

[11] 4,366,200
[45] Dec. 28, 1982

[54] NON-SKID STRUCTURAL SURFACE

[75] Inventor: Walter N. Ecker, North St. Paul, Minn.

[73] Assignee: Proform, Inc., Minneapolis, Minn.

[21] Appl. No.: 220,109

[22] Filed: Dec. 24, 1980

[51] Int. Cl.³ ............................................. B32B 3/00
[52] U.S. Cl. .................................... 428/156; 428/174; 428/180
[58] Field of Search ............... 428/179, 180, 183, 172, 428/174, 213, 156; 52/177; 238/14

[56] References Cited

U.S. PATENT DOCUMENTS 567,985  9/1896  Chair ...................................... 52/177
4,223,835  9/1980  Witt et al. .............................. 238/14

FOREIGN PATENT DOCUMENTS 7242  9/1893  Switzerland .......................... 52/177

Primary Examiner—George F. Lesmes
Assistant Examiner—Beverly K. Johnson
Attorney, Agent, or Firm—Leitner, Palan, Martin & Bernstein

[57] ABSTRACT

A nonskid structural surface (10) is disclosed. The nonskid surface (10) includes a plurality of planar strips (12) alternated with strips (14) having protrusions (16). Protrusion strips (14) preferably have pyramidal-shaped protrusions (16) with adjacent rows of protrusions (16) staggered and alternate rows aligned with one another. Each protrusion (16) has a four-sided pyramidal shape with a rounded apex (20) and a base (18) of four corners. A longer length between one set of opposite corners than width between a second set of opposite corners is preferred.

5 Claims, 7 Drawing Figures

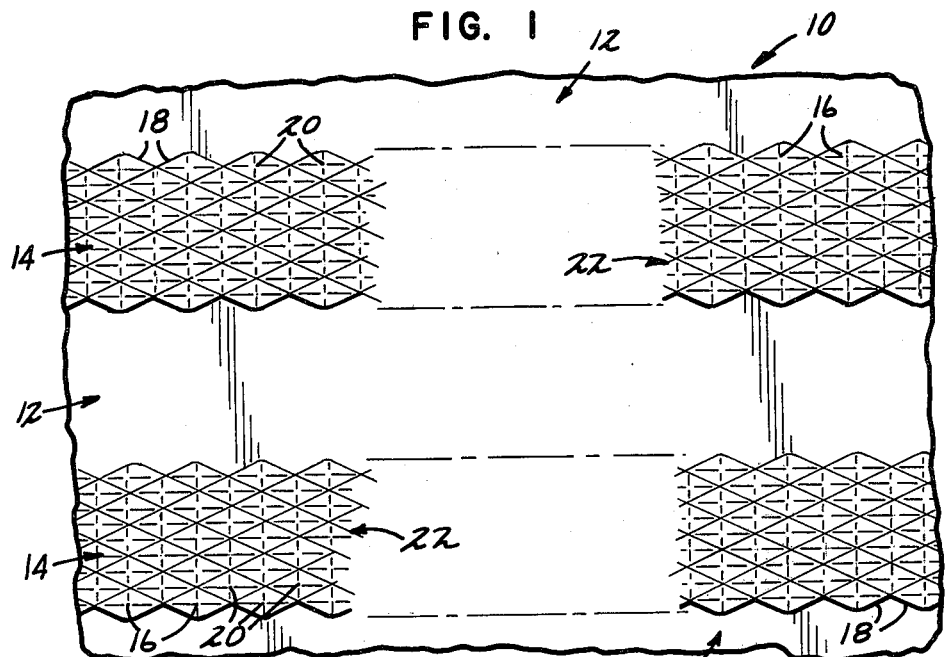
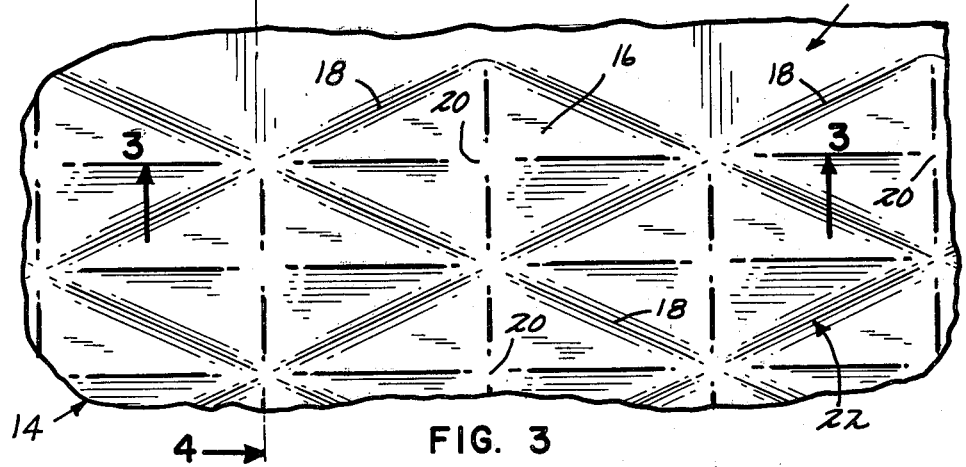
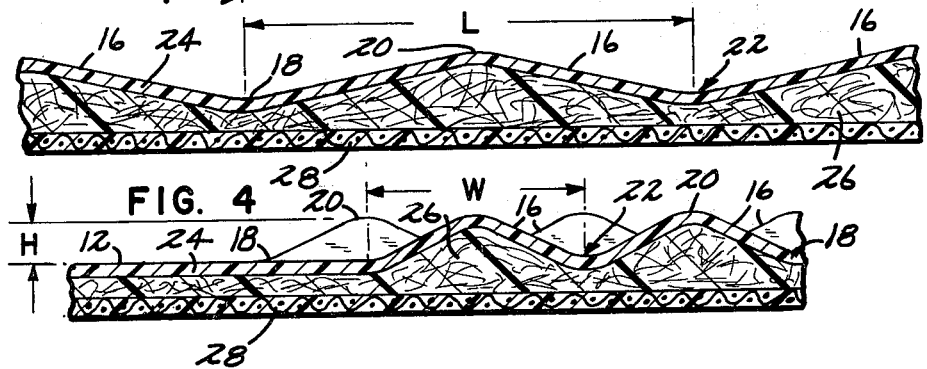

NON-SKID STRUCTURAL SURFACE

TECHNICAL FIELD

This invention relates to a non-skid surface for use generally on fiberglass covers or other fiberglass or structural fabric products which have a walkway thereon.

BACKGROUND OF THE INVENTION

Non-skid walkway surfaces are commonly fabricated into large fiberglass or other structural fabric products having a substantially horizontal surface on which people are expected to walk. For example, covers for river or ocean barges commonly have walkway surfaces extending both laterally and longitudinally. Similarly, railway hopper cars having fiberglass covers often have walkway surfaces extending longitudinally along the cover. Such surfaces commonly have the texture of sand and are fabricated in substantially the following way. Sand is laid on the pattern part at the location and in the pattern required to create the non-skid surface desired for the final piece part. Gel coat, a substance commonly known, is rolled in and around the sand. Layers of fiberglass or other structural fabric and appropriate polyester resin are applied on the pattern part to create the desired structure for the mold part. After a curing time, the mold part is pulled from the pattern part and the sand is brushed or buffed away. The result is a mold part having cavities in the shape of small sand pebbles in the pattern previously applied on the pattern part.

A piece part for final use is fabricated from the mold part using similar commonly known techniques. First gel coat is applied to the mold. Then, chopped fiberglass or other structural chopped material and resin is rolled into the sand-created cavities. Finally, structural fabric and resin are laid as desired.

The problem with this known non-skid surface is that the sand pebbles often create cavities in the mold which have vertical and even concave sides. Hence, when the final piece part is pulled from the mold part, the piece part does not separate clearly or sometimes even rips away a portion of the mold part. Often only a few piece parts can be pulled from a mold part without repairing or maintaining in some way the mold part.

The present invention addresses and solves this and similar problems.

SUMMARY OF THE INVENTION

The present invention is directed to a non-skid structural surface. The non-skid surface includes a plurality of first and second alternate strips. The first strips are relatively planar. The second strips include protrusions extending above the plane of the first strips. The second strips are comprised of a plurality of rows of protrusions. Adjacent rows of protrusions are staggered, while alternate rows of protrusions are aligned with one another.

In a preferred embodiment, each protrusion has a four-sided pyramidal shape with an apex and a base of four corners. The base has a longer length between one set of opposite corners than width between the second set of opposite corners. A length of three quarter inch and a ratio of length to width of approximately 2.3 defines a base which has worked well. The protrusion has height equal to the distance between the base and the apex. A length to height ratio of approximately 12 has worked well. Preferably, each protrusion is separated from adjacent protrusions by a creased surface. The creased surface is rounded as it blends into the walls of adjacent protrusions. The lowest portion of the creased surface is approximately within the plane of the planar strips. In this fashion, the non-skid surface allows water to flow along the creased surfaces and thereby avoid accumulation on the non-skid surface.

A particularly advantageous feature of the present invention is that a non-skid surface may be created for hundreds of piece parts without causing deterioration of the mold part at the locations of the protrusions.

A rounded apex of the protrusions allow the mold part to have a rounded bottom at the location of the inverted protrusion apex for easy cleaning and buffing. Additionally, gelcoat or other materials applied during a fiberglass procedure are much more easily fabricated into the rounded region, as opposed to a pointed region.

A pyramidal shape with a base having a longer length than width has the further advantage of easy cleaning and buffing in the direction of the length.

Creased surfaces between protrusions which have low points approximately within the plane of the planar strips of the non-skid surface have the advantage of directing water away from the protrusions thereby avoiding accumulation of water on the non-skid surfaces, thus decreasing lubricated slipperiness.

These and other advantages and objects obtained by the use of the present invention may be better understood by reference to the drawings which form a further part hereof and to the accompanying descriptive matter in which there is illustrated and described a preferred embodiment of the present invention.

BRIEF DESCRIPTION OF THE DRAWINGS

FIG. 1 is a top view of a non-skid surface in accordance with the present invention;

FIG. 2 is top detail view of an area having protrusions;

FIG. 3 is a cross-sectional view, taken along line 3—3 of FIG. 2, showing the length of a protrusion;

FIG. 4 is a cross-sectional view, taken along line 4—4 of FIG. 2, showing the width of a protrusion;

DETAILED DESCRIPTION OF THE INVENTION

Figure 5:
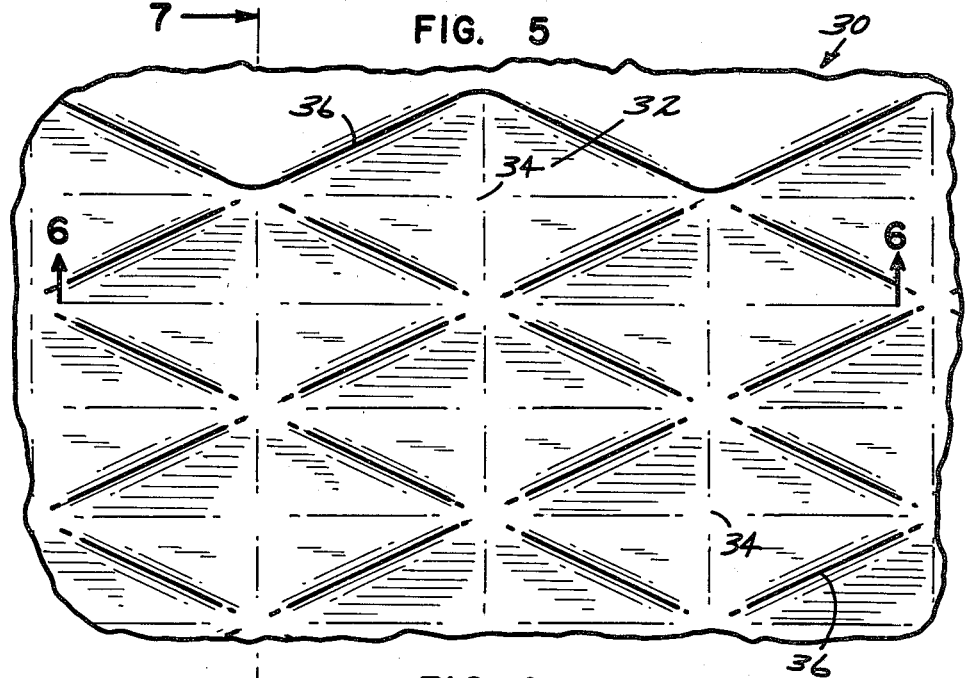
FIG. 5 is a top detail view of a protrusion area of a mold part.

Referring now to drawings, wherein like reference numerals designate identical or corresponding parts throughout the several views, and more particularly to FIG. 1, a non-skid structural surface in accordance with the present invention is designated generally as 10.

In a preferred embodiment, the non-skid surface 10 includes a plurality of planar strips 12 alternated with strips 14 having protrusions 16. The length of strips 12 and 14 depend, of course, on the application. The width of a planar strip 12 relative to a protrusion strip 14 may be varied. It has been found advantageous to have somewhat wider protrusion strips 14 than planar strips 12. A discontinuity offered by a planar strip 12 between two protrusion strips 14 enhances the nonskid effect of the non-skid surface 10. If either planar strips 12 or protrusion strips 14 are too wide, this effect is diminished.

A particular protrusion strip 14 is comprised of a plurality of rows of individual protrusions 16. With pyramidal-shaped protrusions 16, adjacent rows are staggered, while alternate rows are aligned with one another. In a preferred embodiment, each protrusion has a four-sided pyramidal shape with an apex 20 and a base 18 of four corners. Although the base may be square, it is preferable to have a longer length between one set of opposite corners than width between a second set of opposite corners. The length of a base 18 is indicated in FIG. 3 by the letter L. The width of a base 18 is indicated in FIG. 4 by the letter W. A length of ⅜ inch and a ratio of length to width of approximately 2.3 defines a base which has worked well. It is expected that a ratio of length to width ranging from approximately 2 to 2.5 would generally work better than a greater or lesser ratio.

As indicated by the letter H in FIG. 4, a protrusion 16 has a height equal to the distance between the base 18 and the apex 20. A ratio of length to height of approximately 12 further defines a protrusion 16 which has worked well. It is expected that a ratio of length to height ranging from approximately 8 to 15 would generally work better than a lesser or greater ratio.

Preferably, the apex 20 of each protrusion 16 is rounded. Also, each protrusion 16 is separated from adjacent protrusions 16 by a creased surface 22. The creased surface 22 is rounded as it blends into the walls of adjacent protrusions 16. The lowest portion of the creased surface 22 is approximately within the plane of the planar strips 12. In this fashion, the non-skid surface 10 allows water to flow along the creased surfaces 22, thereby avoiding the accumulation of pockets of water on non-skid surface 10.

A nonskid surface 10 is commonly comprised of a variety of fiberglass or other structural fabric-type materials. As shown in FIGS. 3 and 4, the surface material 24 is often a gel coat which includes a coloring substance. Below the surface layer 24 is an upper structural layer 26 often comprised of a chopped structural fabric such as chopped fiberglass embedded in a resinous material. Following the upper structural layer 26 is the primary structural layers 28 comprised of one or more various structural fabrics such as fiberglass woven roven or axial fabric.

Figure 6:
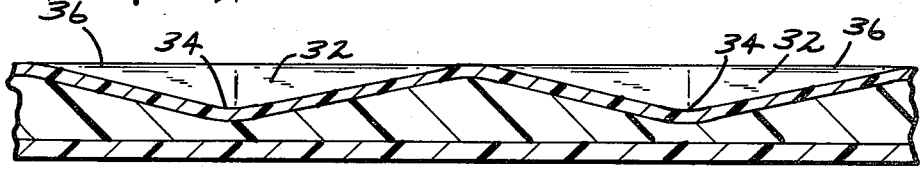
FIG. 6 is a cross-sectional view of the mold part, taken along line 6—6 of FIG. 5.
Figure 7:
FIG. 7 is a cross-sectional view of the mold part, taken along line 7—7 of FIG. 5.

A mold 30 for non-skid surface 10 is illustrated in FIGS. 5-7. Mold 30 has an upper surface the same as, but inverted from, the upper surface of non-skid surface 10. Many advantages of non-skid surface 10 may be better understood by a consideration of mold 30. More particularly, it is a common technique to clean and wax a mold surface several times before laying-up a fiberglass piece part on that mold surface. The indentations 32 which have the inverted shape of protrusions 16 are particularly easy to buff and wax because of the rounded bottoms 34 and the bases 36 which have a longer length than width. The rounded bottoms 34 and bases 36 correspond, of course, to the rounded apex 20 and base 18 of protrusions 16. A buffing wheel or other cleaning and polishing tool is easily and efficiently passed along a line approximately conforming with the length of a row of indentations 32.

The shape of indentations 32 is further advantageous in that a gel coat layer and a subsequent layer of chopped structural fabric combined with a resin are easily applied. The shape of indentations 32 having a relatively short height compared to length and having a rounded bottom 34 make it possible to easily roll chopped structural material into indentations 32 ultimately providing strength for protrusions 16.

The rounded surfaces and the shallow cavities of mold 30 also make it possible to pull many non-skid surface parts 10 from a mold 30 without harming or otherwise deteriorating the mold surface. In this way, the present invention not only provides a part having a nonskid surface, but also reduces substantially the cost of fabricating and maintaining molds for making the non-skid surface parts.

Although numerous characteristics and advantages of the invention have been set forth in the foregoing description, together with details of structure and function of the invention, it is to be understood that the disclosure is illustrative only. Any changes made, especially in matters of shape, size and arrangement, to the full extent extended by the general meaning by the terms in which the appended claims are expressed, are within the principal of the invention.

What is claimed is:

1. A nonskid fiberglass surface comprising:
   a repeating series of first and second adjacent strips, said first strips being relatively planar, said second strips including protrusions extending above the plane of said first strips,
   said second strips comprised of a plurality of rows of said protrusions, adjacent said rows being staggered with respect to one another and alternate said rows being aligned with respect to one another, each said protrusion having a four-sided pyramidal shape with an apex and a base of four corners, said base having longer length between one set of opposite corners than width between a second set of opposite corners.

2. A nonskid fiberglass surface comprising:
   a repeating series of first and second adjacent strips, said first strips being relatively planar, said second strips including protrusions extending above the plane of said first strips,
   said second strips comprised of a plurality of rows of said protrusions, adjacent said rows being staggered with respect to one another and alternate said rows being aligned with respect to one another, each said protrusions having a four-sided pyramidal shape with an apex and a base of four corners, said base having longer length between one set of opposite corners than width between a second set of opposite corners, said protrusion having height equal to the distance between said base and said apex, said pyramidal protrusion being defined by a first ratio of length to height ranging from approximately 8 to 15 and a second ratio of length to width ranging from approximately 2 to 2.5.

3. A non-skid fiberglass surface as recited in claim 2, wherein each said protrusion is separated from adjacent said protrusions by a creased surface, said creased surface being approximately within the plane of said first strips, whereby said non-skid surface allows water to flow along said creased surfaces thereby avoiding accumulation of water upon said non-skid surface.

4. A non-skid fiberglass surface as recited in claim 1, wherein each said protrusion in separated from adjacent said protrusions by a creased surface, said creased surface being approximately within the plane of said first strips, whereby said non-skid surface allows water to flow along said creased surfaces thereby avoiding accumulation of water upon said non-skid surface.

5. A non-skid fiberglass surface comprising:
a repeating series of first and second adjacent strips, said first strips being relatively planar, said second strips including protrusions extending above the plane of said first strips,
said second strips comprised of a plurality of rows of said protrusions, adjacent said rows being staggered with respect to one another and alternate said rows being aligned with respect to one another, each said protrusions having a four-sided pyramidal shape with a rounded apex and a base of four corners, wherein each said base has a longer length between one set of opposite corners than between a second set of opposite corners, said protrusions having height equal to the distance between said base and said rounded apex, said pyramidal protrusion being defined by a first ratio of length to height ranging from approximately 8 to 15 and a second ratio of length to width ranging from approximately 2 to 2.5, and wherein each said protrusions is separated from adjacent said protrusions by a creased surface, said creased surface being approximately within the plane of said first strips, whereby said non-skid surface allows water to flow along said creased surfaces thereby avoiding accumulation of water upon said non-skid surface.

* * * * *